US006823514B1

(12) United States Patent
Degenaro et al.

(10) Patent No.: US 6,823,514 B1
(45) Date of Patent: Nov. 23, 2004

(54) METHOD AND SYSTEM FOR CACHING ACROSS MULTIPLE CONTEXTS

(75) Inventors: Louis R. Degenaro, White Plains, NY (US); Arun K. Iyengar, Yorktown Heights, NY (US); Thomas A. Mikalsen, Carmel, NY (US); Isabelle M. Rouvellou, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 601 days.

(21) Appl. No.: 09/712,542

(22) Filed: Nov. 14, 2000

(51) Int. Cl.[7] .............................................. G06F 9/00
(52) U.S. Cl. ..................... 718/104; 718/105; 711/200
(58) Field of Search ................................ 718/100, 102, 718/103, 104, 105; 711/200; 707/200, 201, 202; 709/100, 101, 102, 103, 104, 105

(56) References Cited

U.S. PATENT DOCUMENTS

| 5,491,817 A | * | 2/1996 | Gopal .......................... 707/200 |
| 5,893,912 A | * | 4/1999 | Freund et al. ............ 707/103 R |
| 6,026,428 A | * | 2/2000 | Hutchison et al. ........... 718/108 |
| 6,591,357 B2 | * | 7/2003 | Mirsky ........................... 712/18 |

OTHER PUBLICATIONS

Challenger et al., "A Scalable System for Consistently Caching Dynamic Web Data", Proceedings of INFOCOM 99, Mar. 1999.
Degenaro et al., "A Middleware System Which Intelligently Caches Query Results", Proceedings of Middleware 2000, Apr. 2000.
Kung et al., "On Optimistic Methods for Currency Control", ACM Transactions on Database Systems, vol. 6, No. 2, Jun. 1981, pp. 213–226.

* cited by examiner

Primary Examiner—Majid A. Banankhah
(74) Attorney, Agent, or Firm—F. Chau & Associates, LLC

(57) ABSTRACT

In a system that includes a plurality of objects and at least one cache, wherein each object has a key associated therewith and is capable of having different values for at least two of a plurality of different contexts, a method for caching at least some of the plurality of objects is provided. The method includes the step of maintaining a cache directory structure in which at least two different values are capable of being associated with at least one of the plurality of objects, each of the at least two different values corresponding to a different context. An object to be cached is identified from among the plurality of objects and also a context from among the plurality of different contexts. The identified object is stored in the at least one cache based upon the key associated therewith and the identified context.

24 Claims, 17 Drawing Sheets

< Key%C1, V1>
< Key%C2, V2>
< Key%C3, V3>

METHOD AND SYSTEM FOR CACHING ACROSS MULTIPLE CONTEXTS

BACKGROUND

1. Technical Field

The present invention relates generally to computer systems and, in particular, to a method and system for caching across multiple contexts in a computer system.

2. Background Description

A context is a scope in which variables and/or keys are resolved to specific values. The contexts could represent transactions. Alternatively, they could represent different procedure invocations. Programming languages such as C, C++, Java, and Pascal, among others, may create multiple contexts. Two contexts might have variables of the same name but with different values within the different contexts. For example, suppose that the main body of a C program has a variable x. The main program calls a function foo which has a local variable x. When foo is called from the main program, this creates a new context. The value of x within the context of the function foo may be different from the value for x within the context of the main program. A context may also represent a transactional context. A transaction is a series of operations applied to a set of objects in a manner that transforms the system from one consistent state to another consistent state. Transactional contexts isolate the effects of transactions such that concurrently executing transactions do not interfere with each other; such interference, in general, leads to data inconsistencies.

Accordingly, it would be desirable and highly advantageous to have a method and system for caching across multiple contexts in a computer system. It would also be desirable and highly advantageous for such a method and system to maintain data consistency.

SUMMARY OF THE INVENTION

The problems stated above, as well as other related problems of the prior art, are solved by the present invention, a method and system for caching across multiple contexts in a computer system.

According to a first aspect of the invention, in a system that includes a plurality of objects and at least one cache, wherein each object has a key associated therewith and is capable of having different values for at least two of a plurality of different contexts, a method for caching at least some of the plurality of objects is provided. The method includes the step of maintaining a cache directory structure in which at least two different values are capable of being associated with at least one of the plurality of objects, each of the at least two different values corresponding to a different context. An object to be cached is identified from among the plurality of objects and also a context from among the plurality of different contexts. The identified object is stored in the at least one cache based upon the key associated therewith and the identified context.

According to a second aspect of the invention, the at least one cache maintains at least a portion of a data structure for storing multiple versions of the identified object and said storing step further includes the step of identifying the at least a portion of the data structure from the key associated with the identified object.

According to a third aspect of the invention, the storing step further includes the steps of generating a composite index from the key associated with the identified object and the identified context, and storing the identified object based upon the composite index.

According to a fourth aspect of the invention, the method further includes the step of looking up a given object from among the plurality of objects based upon a key associated with the given object and one of the plurality of different contexts.

According to a fifth aspect of the invention, the method further comprises the step of deleting a cached object based upon a key associated with the cached object and one of the plurality of different contexts.

According to a sixth aspect of the invention, the method further includes the steps of maintaining a data structure that includes at least one key associated with at least one given object from among the plurality of objects, the at least one given object being cached within one of the plurality of different contexts; and deleting the at least given object by identifying the at least one object in the data structure based upon the at least one key associated therewith.

According to a seventh aspect of the invention, the method further includes the step of copying at least one given object from among the plurality of objects that is cached under one of the plurality of contexts to another one of the plurality of contexts.

According to an eighth aspect of the invention, the plurality of different contexts represent transactional contexts.

According to a ninth aspect of the invention, cached objects represent query results.

According to a tenth aspect of the invention, in a system that includes at least one object capable of having a plurality of values within a plurality of different contexts, a method for propagating at least one of the plurality of values among the plurality of different contexts is provided. The method includes the step of maintaining at least one dependency between the at least one object and underlying data. The at least one of the plurality of values is identified for the at least one object within a context from among the plurality of contexts. The at least one of the plurality of values is propagated to at least one other context from among the is plurality of contexts. The at least one object has identical dependencies in the context and the at least one other context.

According to an eleventh aspect of the invention the underlying data is dependent underlying data, and at least some of the plurality of values are derived from the dependent underlying data.

According to a twelfth aspect of the invention, the underlying data is dependent underlying data, and at least some of the plurality of values are query results derived from the dependent underlying data.

According to a thirteenth aspect of the invention, the plurality of different contexts are transactional contexts.

According to a fourteenth aspect of the invention, cached objects are query results and the plurality of different contexts are transactional contexts.

According to a fifteenth aspect of the invention, in a system that includes at least one object capable of having a plurality of values within a plurality of different contexts, wherein a value from among the plurality of values of the at least one object depends on underlying data, a method for maintaining dependencies between the at least one object and the underlying data when effects from a context among the plurality of contexts are realized within at least one other context among the plurality of contexts is provided. The method includes the step of recording at least one event that occurs with the context, wherein the at least one event is capable of affecting dependencies between the at least one object and the underlying data within the at least one other context. Within the at least one other context, changes are realized to the underlying data performed under the context. Also within the at least one other context, the at least one event recorded within the context is replayed.

According to a sixteenth aspect of the invention, the plurality of contexts are transactional contexts and the realizing step includes the step of committing the context as a transactional context.

According to a seventeenth aspect of the invention, a computer system is provided. The computer system includes at least one client, at least one server, a cache adapted to allow multiple copies of a same object to be cached under different contexts, and a context manager adapted to manage the different contexts.

According to an eighteenth aspect of the invention, the context manager is a transaction manager.

According to a nineteenth aspect of the invention, the context manager is a transaction manager adapted to support lock-based, pessimistic concurrency control.

According to a twentieth aspect of the invention, the context manager is a transaction manager adapted to support optimistic concurrency control.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

The present invention is directed to a method and system for caching across multiple contexts in a computer system. It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform may also include an operating system and/or micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

A general description of the present invention will now be provided to introduce the reader to the concepts of the invention. Subsequently, more detailed descriptions of various aspects of the invention will be provided with respect to FIGS. 1 through 23.

Figure 1:
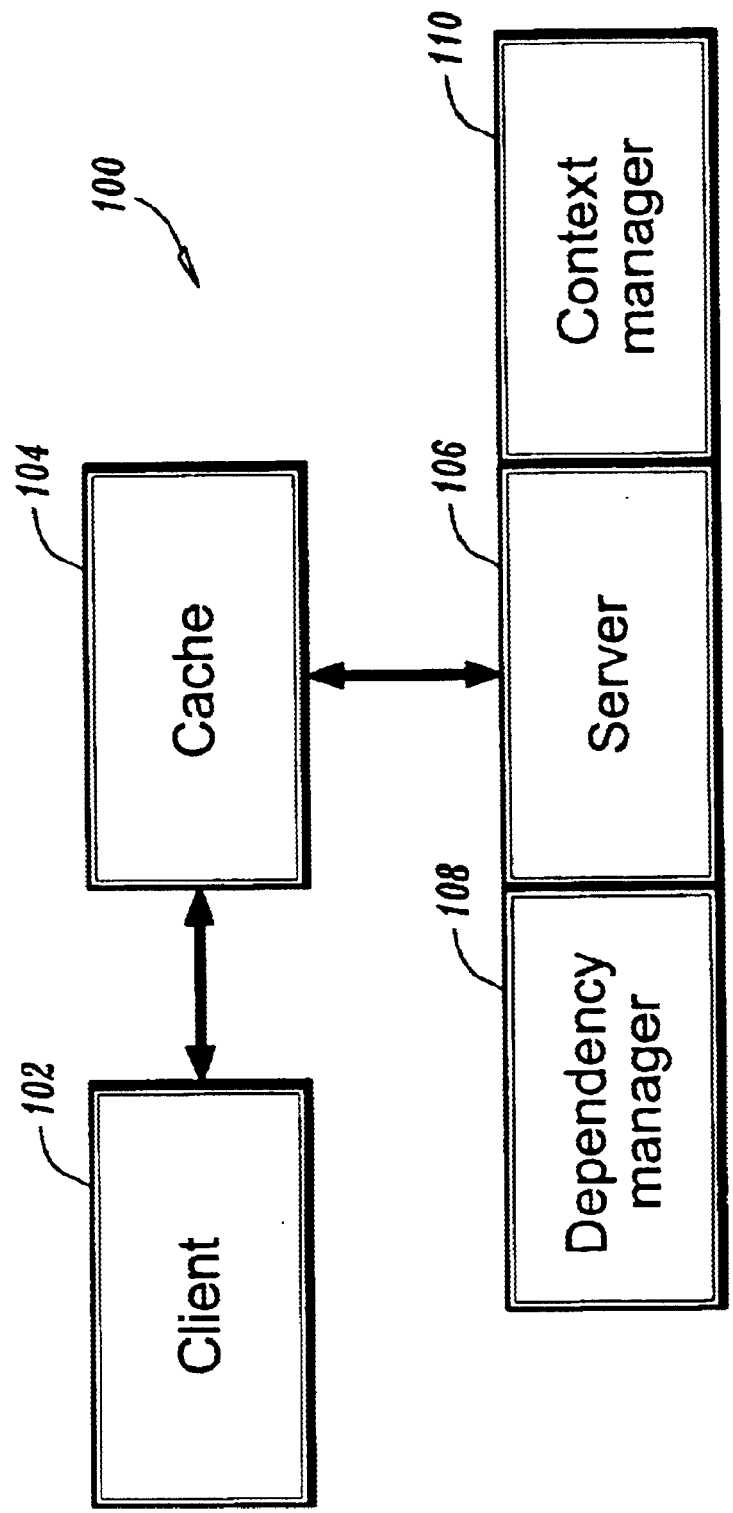
FIG. 1 is a block diagram illustrating a system for caching across multiple contexts, according to an illustrative embodiment of the invention.

FIG. 1 is a block diagram illustrating a system 100 for caching across multiple contexts, according to an illustrative embodiment of the invention. The system 100 includes a client 102, a cache 104, a server 106, a dependency manager 108, and a context manager 110.

The client 102 obtains data from the server 106. To reduce latency and/or overhead for obtaining data from the server 106, some data may be cached within the cache 104. Obtaining data from the cache 104 generally results in less overhead than obtaining the data from the server 106. The server 106 creates multiple contexts which are managed by the context manager 110.

The invention is applicable to several variations of the system of FIG. 1. For example, the system 100 may include more than one of any of the elements shown in FIG. 1. Moreover, the context manager 110 does not necessarily have to reside on the server 106. Further, it is possible for the cache 104 to reside on the client 102 or on the server 106. It is also possible for the client 102 to communicate directly with the server 106. Given the teachings of the invention provided herein, one of ordinary skill in the related art will contemplate these and many other variations of the system 100 of FIG. 1, while maintaining the spirit and scope thereof.

Figure 5:
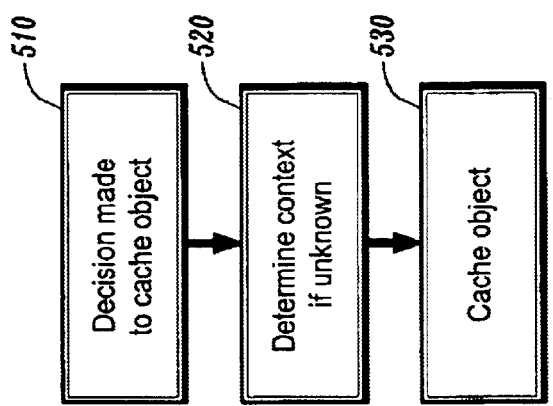
FIG. 5 is a flow diagram illustrating a method for caching data, according to an illustrative embodiment of the invention.

FIG. 5 is a flow diagram illustrating a method for caching data, according to an illustrative embodiment of the invention. A decision is made to cache an object (step 510). Step 510 may occur, for example, when the client 102 tries to access an object in the cache 104 and the object is not contained in the cache 104. Step 510 may also occur when the server 106 prefetches an object into the cache 104.

The context corresponding to the object is determined, if the context is unknown (step 520). However, it may be the case that the context was previously determined.

The object is cached (stored) in a manner which takes both the key identifying the object and the context into consideration (step 530). This can be done in several ways.

Figure 2:
FIG. 2 is a diagram illustrating a method for storing data in a cache, according to an illustrative embodiment of the invention.

One way is illustrated in FIG. 2, which is a diagram illustrating a method for storing data in a cache, according to an illustrative embodiment of the invention. In the example of FIG. 2, objects are cached based on their keys. For a given key, multiple values may be stored corresponding to different contexts. In the example, there are three values associated with the key. Value V1 is associated with context C1, value V2 is associated with context C2, and value V3 is associated with context C3. FIG. 2 depicts the context, value pairs as a list. However, other methods could be used for storing context, value pairs including, but not limited to, hash tables or balanced trees. Given the teachings of the invention provided herein, one of ordinary skill in the related are will contemplate these and various other ways to store objects with respect to both the key identifying the object and the context, while maintaining the spirit and scope of the invention.

Figures 3, 4:
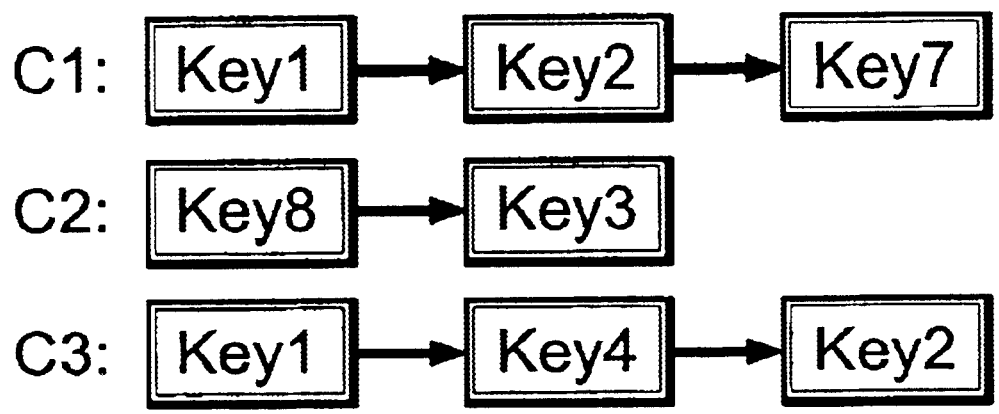
FIG. 3 is a diagram illustrating another method for storing data in a cache, according to another illustrative embodiment of the invention.
FIG. 4 is a diagram illustrating a method for storing references to cached data organized by context, according to an illustrative embodiment of the invention.

FIG. 3 is a diagram illustrating another method for storing data in a cache, according to another illustrative embodiment of the invention; In the example of FIG. 3, a composite index is composed by combining the key and context into a single entity. That is, the 3 different cached values for "key" under the 3 different contexts are stored as different entities under different composite indices. Look up is performed using the composite index. Given the teachings of the invention provided herein, one of ordinary skill in the related art will contemplate these and many other ways in which to generate composite indices from keys and contexts, while maintaining the spirit and scope thereof. For example, one method would be to use character strings to represent both keys and contexts, concatenating the keys and contexts, but separating the strings representing keys and contexts by a delimiter indicating the end of the key. In FIG. 3, the symbol "%" designates such a delimiter.

The cache 104 may optionally maintain keys associated with specific contexts as depicted in FIG. 4, which is a diagram illustrating a method for storing references to cached data organized by context, according to an illustrative embodiment of the invention. The method allows the system 100 to easily determine the objects stored in a specific context. FIG. 4 illustrates the set of keys corresponding to cached objects within a context stored in a list. However, other methods could be used including, but not limited to, hash tables or balanced trees. These and other methods for accomplishing the same are readily determined by one of ordinary skill in the related art, while maintaining the spirit and scope of the invention. It is to be noted that if the cache is maintaining this information, then the key may be added to an appropriate data structure at step 530.

Figure 6:
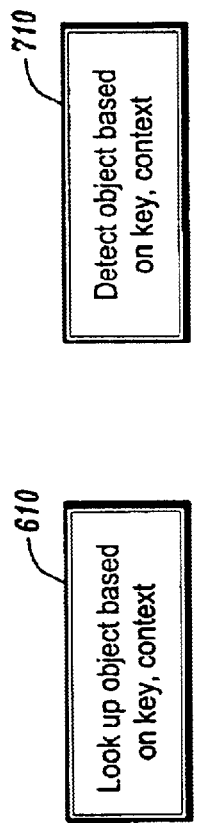
FIG. 6 is a diagram illustrating a method for accessing cached data, according to an illustrative embodiment of the invention.

FIG. 6 is a diagram illustrating a method for accessing cached data, according to an illustrative embodiment of the invention. This may occur when the client 102 requests data which is stored in the cache 104. To look up an object, both the key and the context are used.

Figure 7:
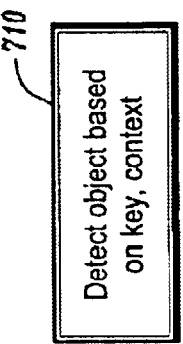
FIG. 7 is a diagram illustrating a method for deleting cached data, according to an illustrative embodiment of the invention.

FIG. 7 is a diagram illustrating a method for deleting cached data, according to an illustrative embodiment of the invention. This may occur when the cache 104 overflows, when the cached data are known to be obsolete, and so forth. The object to be deleted is identified based on both its key and its context. If the cache 104 is maintaining keys associated with specific contexts (e.g., FIG. 4), the key also may be deleted from the data structure corresponding to the context.

Figure 8:
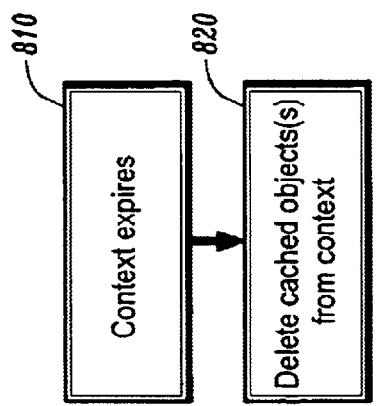
FIG. 8 is a flow diagram illustrating a method for deleting cached objects corresponding to a specific context, according to an illustrative embodiment of the invention.

FIG. 8 is a flow diagram illustrating a method for deleting cached objects corresponding to a specific context, according to an illustrative embodiment of the invention. In some cases, a context may expire, or the cache 104 may decide to delete all objects corresponding to a context because the context is no longer of sufficient importance (step 810). The context manager 110 might notify the cache 104 when a context expires. In either case, the cache 104 deletes one or more objects corresponding to the context (step 820). A preferred method for doing this is for the cache 104 to maintain a data structure containing keys corresponding to objects cached in the context (e.g., FIG. 4). The objects to be deleted are then identified from this data structure. After all such objects are identified from the data structure, the data structure can be deleted. For example, suppose that in FIG. 4, context C1 expires. The system 100 determines from the data structure that the C1 versions of key1, key2, and key7 can be deleted.

Figure 9:
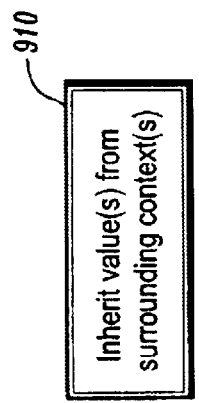
FIG. 9 is a diagram illustrating a method for caching data inherited from an enclosing context, according to an illustrative embodiment of the invention.

FIG. 9 is a diagram illustrating a method for caching data inherited from an enclosing context, according to an illustrative embodiment of the invention. As shown, in some cases, a context C1 may inherit values from a surrounding context (step 910). When this happens, cached values from the surrounding context are copied to context C1.

Figure 12:
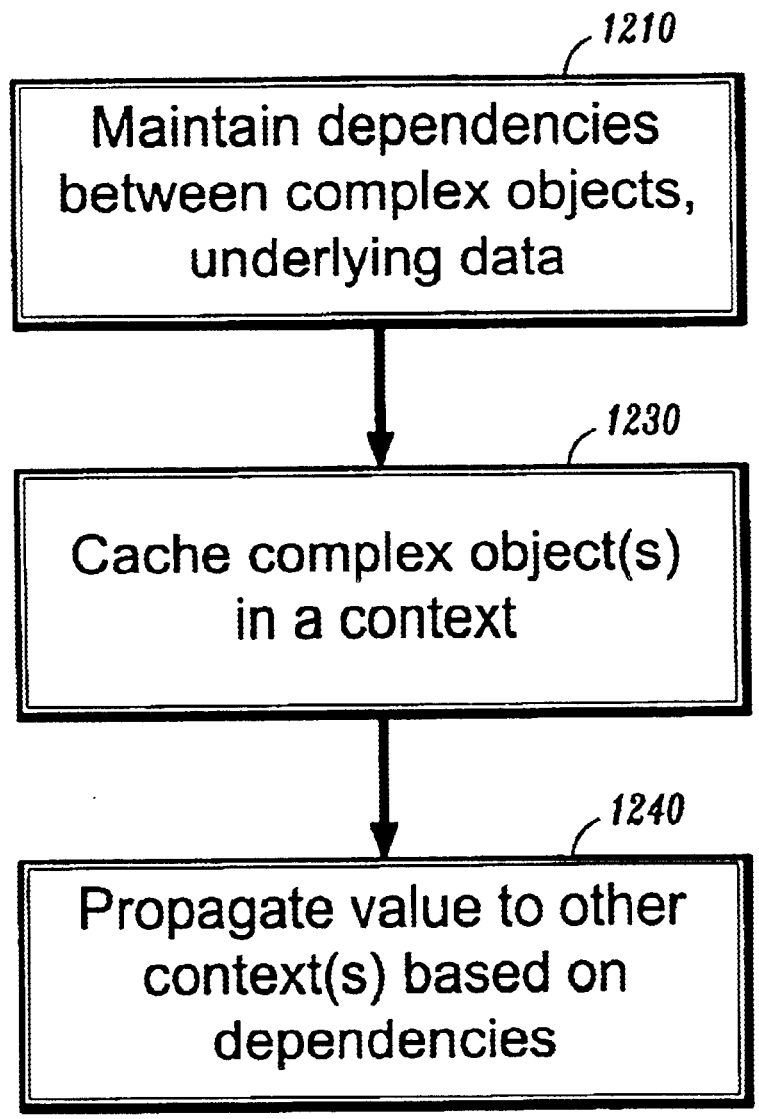
FIG. 12 is a flow diagram illustrating a method for propagating cached information from one context to another, according to an illustrative embodiment of the invention.

It is often desirable to share cached information between contexts. If the value for an object is cached in one context, it would be desirable to propagate the value to other contexts which share the same value for the object. FIG. 12 is a flow diagram illustrating a method for propagating cached information from one context to another, according to an illustrative embodiment of the invention. It is applicable when cached objects are complex objects with dependencies on underlying data. In such situations, such dependencies can be represented by one or more object dependence graphs (ODG).

Figure 10:
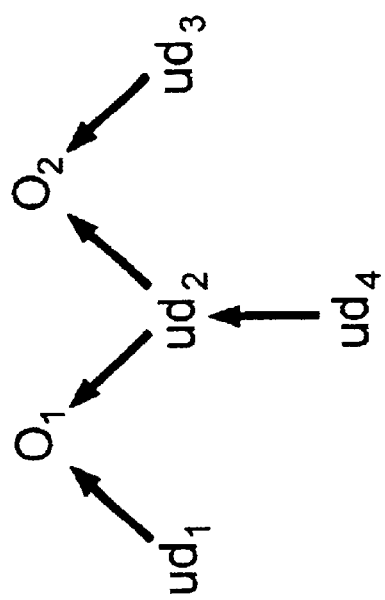
FIG. 10 is a diagram illustrating an object dependence graph, according to an illustrative embodiment of the invention.
Figure 11:
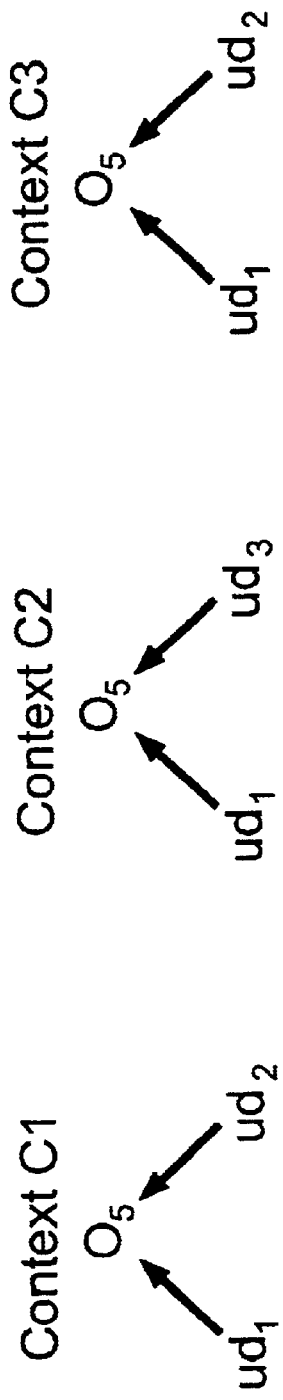
FIG. 11 is a diagram illustrating dependencies of an object in different contexts, according to an illustrative embodiment of the invention.

FIG. 10 is a diagram illustrating an object dependence graph, according to an illustrative embodiment of the invention. In FIG. 10, O1 and O2 are objects. O1 has, dependencies on ud1 and ud2. That is, if ud1 or ud2 change, then the value of O1 might also change. The edges in the object dependency graph from ud1 and ud2 to O1 reflect these dependencies. The edge from ud4 to ud2 indicates that if ud4 changes, ud2 (and by transitivity O1 and O2) might also be affected.

Complex objects could represent Web pages, while the underlying data could represent parts of databases, such as tables. For a description of such tables, see "A Scaleable System for Consistently Caching Dynamic Web Data", Challenger et al., Proceedings of INFOCOM '99, March 1999. Alternatively, complex objects could represent query results, and underlying data could represent attributes. For a description of such attributes, see "A Middleware System Which Intelligently Caches Query Results", Degenaro et al., Proceedings of Middleware 2000, April 2000.

Alternatively, complex objects and/or underlying data could be something else. Methods for constructing object dependency graphs and performing graph traversal algorithms for determining how changes to underlying data affect cached objects are described in the previously mentioned articles.

Returning to FIG. 12, the system 100 maintains dependencies between complex objects and underlying data (step 1210). Preferred methods for doing so are described in the previously mentioned articles. Of course, the invention is not limited to those methods and, thus, other methods for maintaining dependencies between complex objects and underlying data may be used while maintaining the spirit and scope of the invention.

A complex object O5 is cached within a context C1 (step 1230). The value of O5 is propagated to other contexts in which O5 has the same dependencies as in C1 (step 1240). For example, in FIG. 11, which is a diagram illustrating dependencies of an object in different contexts according to an illustrative embodiment of the invention, O5 has dependencies on ud1 and ud2. The value of O5 could thus be propagated to context C3. However, the value of O5 should not be propagated to context C2 for which O5 has dependencies on ud1 and ud3.

FIGS. 13 through 23 depict various aspects of the invention with respect to transactions and concurrency control. A transaction is a series of operations applied to a set of objects in a manner that transforms the system from one consistent state to another consistent state. Concurrency control is the mechanism by which multiple transactions are allowed to execute concurrently in a manner that guarantees consistency. Such mechanisms guarantee consistent state transformations by validating that, given a series of concurrently executing transactions, there exists a serial-equivalent ordering of those transactions that produces the same state transformation. If no such serial-equivalent ordering can be validated, some action is taken to ensure that a serial-ordering exists. The most commonly used concurrency control mechanisms are classified as either pessimistic or optimistic. These mechanisms alter the execution ordering of concurrently executing transactions, either by delaying transactions or by aborting transactions, such that a serial-equivalent ordering can be validated.

Pessimistic concurrency control refers to mechanisms using object-locking to enforce a serial-equivalent ordering. Most such mechanisms use two-phase locking, where a transaction must acquire a read-lock prior to reading an object and a write-lock prior to writing an object, but must not acquire additional locks after releasing any lock. When a transaction attempts to acquire a lock on an object, the transaction must wait if a different transaction already holds a conflicting lock on that object. Conflicting locks are as follows: read-locks conflict with write-locks; and write-locks conflict with write-locks. Two-phase locking is further described in the following article by Gray et al., entitled "Transaction Processing: Concepts and Techniques", Morgan Kaufmann, pub., 1993.

Optimistic concurrency control refers to mechanisms that do not use locking to enforce serial-equivalent ordering. Rather, transactions are allowed to execute to completion in the "hope" that a serial-equivalent ordering exists. Each transaction is given its own view of the objects that have been accessed by the transaction. A transaction operates on its view rather than the shared state of the system. When a transaction attempts to commit, the concurrency control attempts to validate that, should the transaction commit, a serial-equivalent ordering exists. If such a ordering can be validated, the transaction is allowed to commit; otherwise, it is aborted. Various techniques have been employed to validate serial-equivalence for optimistic mechanisms, including the use of time-stamps and the intersection of read/write sets. Optimistic concurrency control is further described in the following article by Kung et al., entitled "On Optimistic Methods for Concurrency Control", ACM Transactions on Database Systems, Vol. 6, No. 2, pp. 213–26, June 1981.

Figure 13:
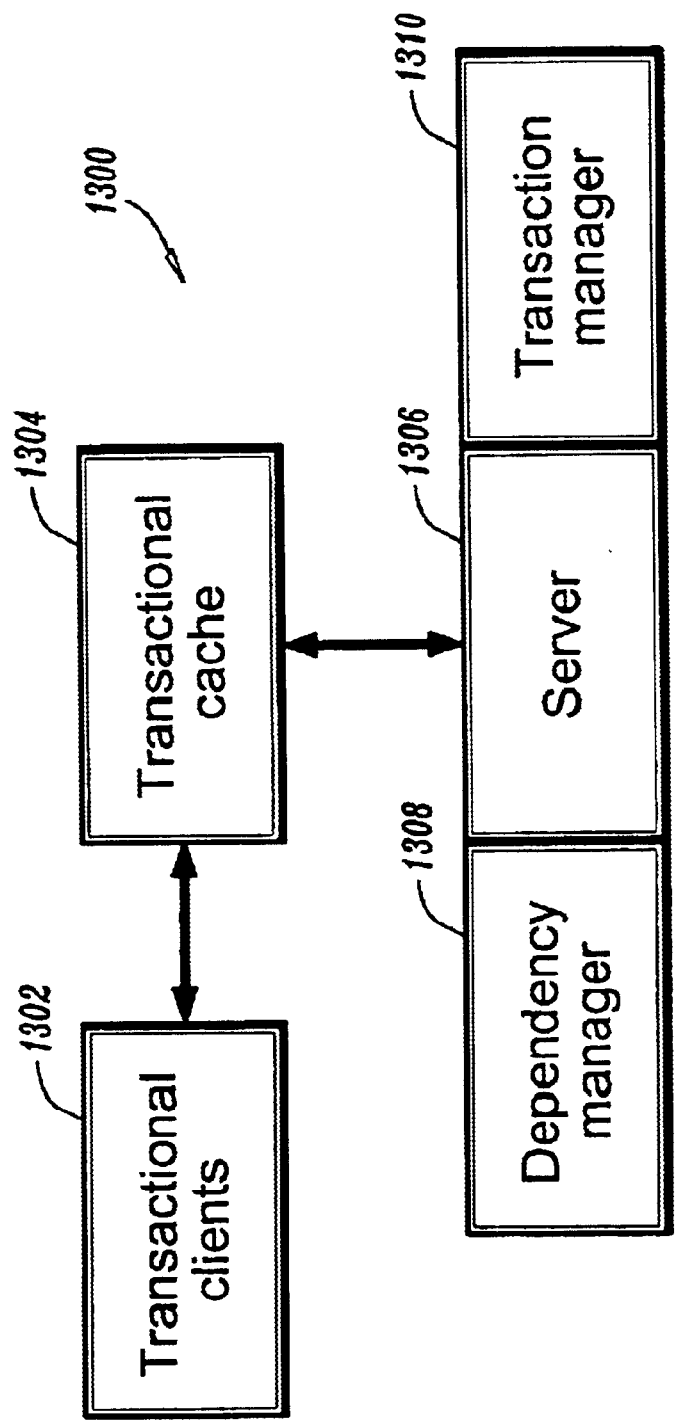
FIG. 13 is a block diagram illustrating a system for caching across multiple contexts according to an illustrative embodiment of the invention, wherein contexts may represent transactional contexts and cached objects may represent query results.

FIG. 13 is a block diagram illustrating a system 1300 for caching across multiple contexts according to an illustrative embodiment of the invention, wherein contexts may represent transactional contexts and cached objects may represent query results. However, given the teachings of the invention provided herein, it is to be appreciated that the invention could be applied to other types of contexts and other types of cached objects, while maintaining the spirit and scope of the invention.

The system 1300 includes a transactional client(s) 1302 (hereinafter "transactional client"), a transactional cache 1304, a server 1306, a dependency manager 1308, and a transaction manager 1310.

The transactional client 1302 issues a query on the server 1306. Issuing a query might involve, for example, transmitting a query specification, parsing the query specification on the server 1306, evaluating the query specification on the server 1306, and returning the results of the query from the server 1306 to the client 1302. To reduce the cost of such queries, results of previously evaluated queries may be stored within the cache 1304. The transaction manager 1310 creates and manages multiple transactional contexts. Each client interaction with the server 1306 takes place within a particular transactional context. The dependency manager 1308 manages dependencies between data and cached query results such that changes to data will cause dependent query results to be invalidated, thereby causing updating in or removal from the cache 1304. The visibility of data and cached query results to a particular client executing within a particular transactional context is governed by the concurrency control employed by the server 1306.

FIGS. 14 through 18 depict various aspects of the invention with respect to FIG. 13 and optimistic concurrency control. To support optimistic concurrency control in the cache 1304, a system in accordance with the present invention might manage the cache as follows. Each cached query result is valid with respect to zero or more transactional contexts, and possibly represents a query of committed data; cached query results representing queries of committed data are called "committed results". If a query result is valid with respect to a transactional context, we say that the query result is "visible" to that transactional context. When a transactional context, T, is first created, all committed results are visible to T. Queries issued within transactional context T will resolve to a cached query result if such a result is visible to T. If no cached query result is visible to T, then the query is issued to the server, and the query result is cached such that it is visible only to T; such a query result is considered a "pending" result. Changes to data within transactional context T on which query results visible to T depend will invalidate those query results with respect to T. That is, if a query result invalidated by T is visible to transactions other than T, the query result will remain valid in and visible to those other transactions, but will no longer be valid in or visible to T. Should T commit successfully, the effects of T, including any invalidations, must be reflected in the cache. To this end, all invalidation events that occur within T are recorded. When T commits successfully, these invalidation events are replayed in the context of the committed results. Any committed results affected by the replay are invalidated. If any such invalidated query has been accessed within an active transactional context, the corresponding transaction is aborted (or marked as rollback only). Any pending cached query results associated with T are then "promoted" to committed results.

Figure 14:
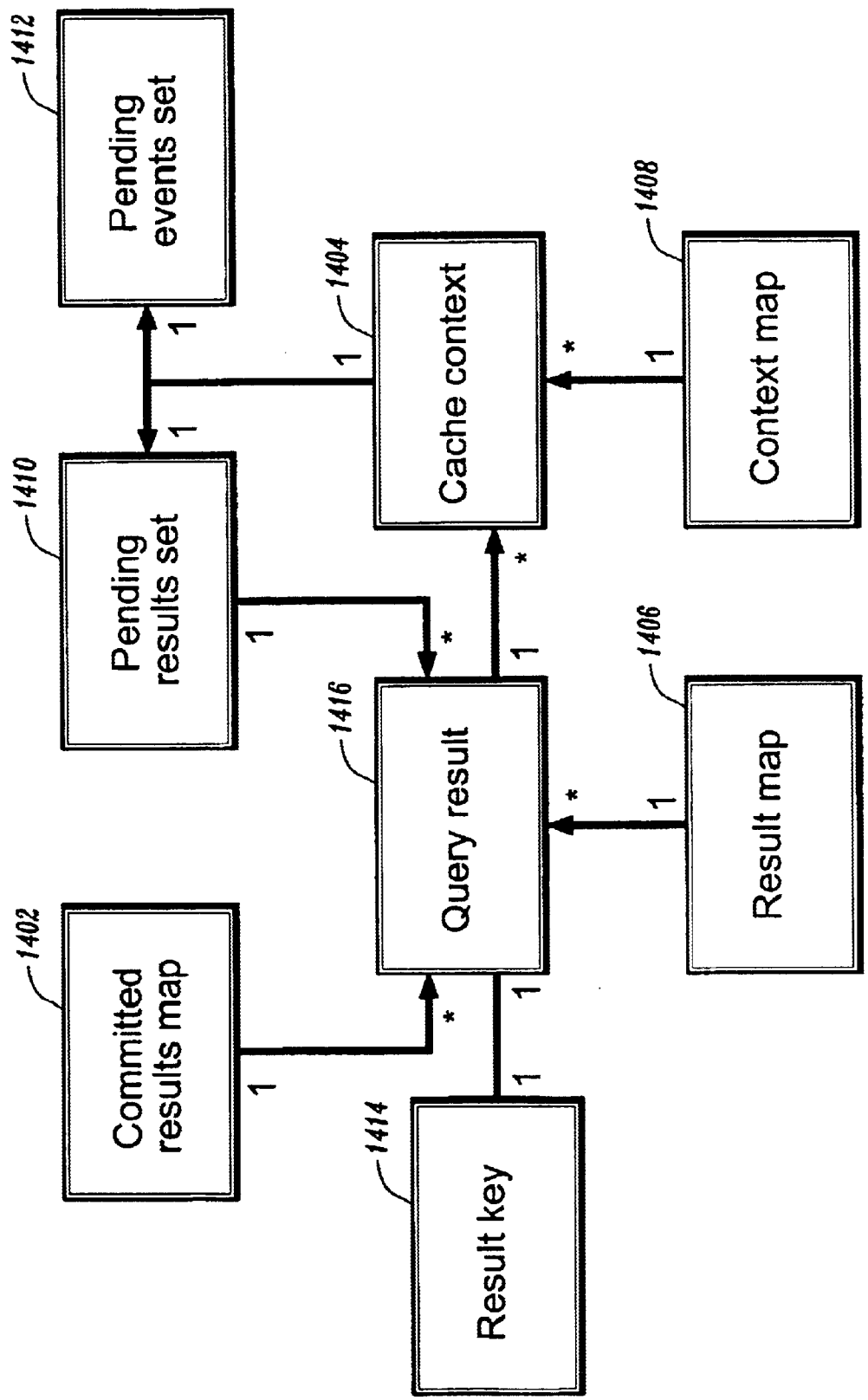
FIG. 14 is a block diagram illustrating a cache where query results are cached with respect to transactional contexts and optimistic concurrency, according to an illustrative embodiment of the invention.

FIG. 14 is a block diagram illustrating a cache where query results are cached with respect to transactional contexts and optimistic concurrency, according to an illustrative embodiment of the invention. A result map 1406 maps result keys 1414 to zero or more query results 1416. Each of the query results 1416 is uniquely identified by one of the result keys 1414. A result key is a (query-spec, tid) pair, where a "query-spec" is a query specification as issued to the server 1306 and a "tid" is a unique transaction context identifier representing the transaction context in which the query was issued. A query result can be either valid or invalid, depending on the value of the query result. If a query result is valid, then the value is the result of the query issued to the server 1306. If a query result is invalid, this result will be null.

The committed results map 1402 maps query specifications to zero or more cached query results 1416 representing the results of queries of committed data. The map might, for example, be implemented as a hash-table using the query specification as the key. Cached query results associated in committed results map 1402 are called "committed results". Committed results are always valid; if a committed result becomes invalid, it is removed from the committed result map. Each committed result is associated with zero or more cache contexts 1404, indicating which contexts have accessed that committed result. This association might, for example, be implemented as a linked-list. When a committed result is accessed within transaction context T, that query result becomes associated with T's cache context 1404.

Zero or more cache contexts 1404 represent the transactional contexts in which the cache 1304 is accessed. Each cache context 1404 comprises a pending results set 1410 and a pending events set 1412. The pending results set 1410 represents the set of zero or more cached query results obtained or invalidated within a particular transactional context. The set might, for example, be implemented as a linked list. The pending events set 1412 represents the set of events that occurred within some transactional context, T, that might affect committed results should T commit. The set might, for example, be implemented as a linked list.

A context map 1408 maps transaction context identifiers, tids, to zero or more cache contexts 1404. The map might, for example, be implemented as a hash table, using the transaction identifier, tid, as the key. This map is used to locate the cache context 1404 associated with a given transaction context.

Figure 15:
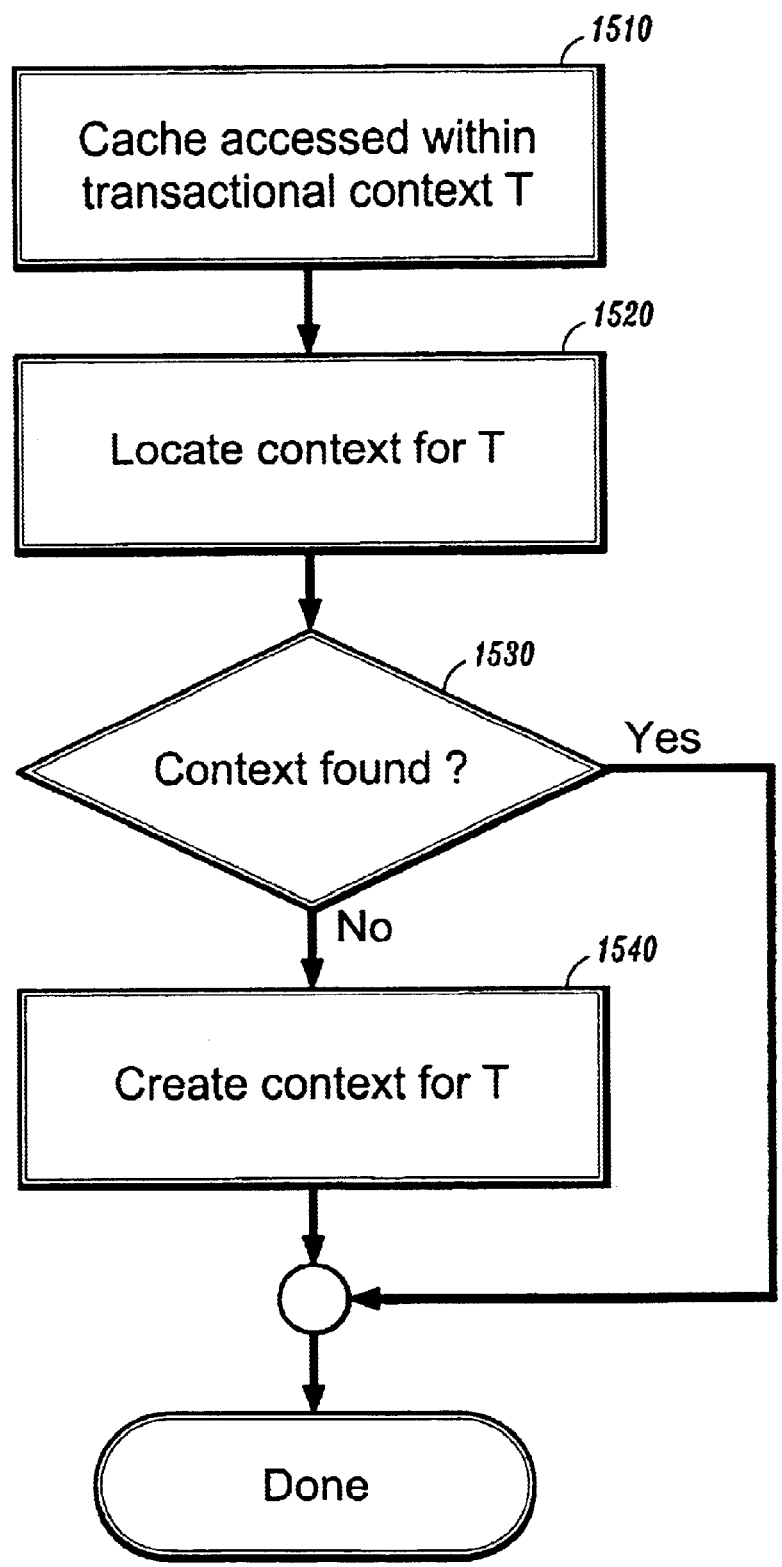
FIG. 15 is a flow diagram illustrating a method for determining the cache context associated with a particular transactional context, according to an illustrative embodiment of the invention.

FIG. 15 is a flow diagram illustrating a method for determining the cache context 1404 associated with a particular transactional context, according to an illustrative embodiment of the invention. The cache 1304 is accessed within a particular transaction context, T (step 1510). This might arise when a transactional client 1302 issues a query, or when a transactional client causes data changes on the server 1306 such that the dependency manager 1308 attempts to invalidate a query result.

The cache context 1404 associated with T is located (step 1520). This is done using the context map 1408. A mapping for such a context may or may not exist within the context map 1408.

It is then determined whether a cache context 1404 associated with T was found (step 1530).

If no cache context 1404 associated with T is found, indicating that the cache 1304 is being accessed for the first time within context T, then a new cache context 1404 is created for T (step 1540). The newly created cache context contains an empty pending results set 1410 and an empty pending events set 1412.

Figure 16:
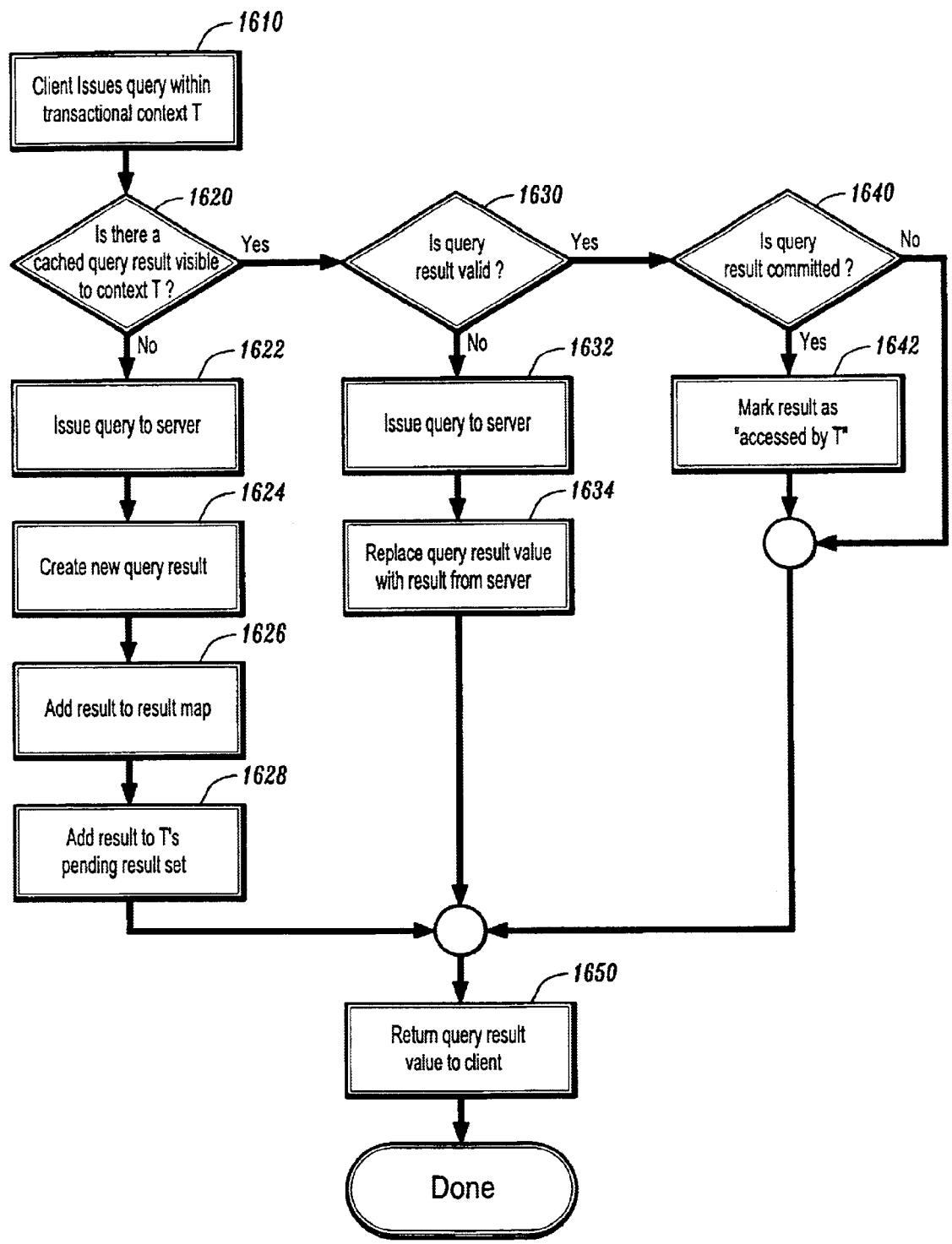
FIG. 16 is a flow diagram illustrating a method for caching the results of queries with respect to transactions and optimistic concurrency control, according to an illustrative embodiment of the invention.

FIG. 16 is a flow diagram illustrating a method for caching the results of queries with respect to transactions and optimistic concurrency control, according to an illustrative embodiment of the invention. That is, FIG. 16 illustrates a method for accessing a cached query result for a query issued by a transactional client within a particular transaction context.

The transactional client 1302 issues a query within transactional context T (step 1610). It is determined whether or not there is a query result for this query visible within context T (step 1620). To determine whether or not a cached query result is visible within context T, result map 1406 is used to locate a query result 1416 with result key 1414 given by the pair (query-spec, tid), where query-spec is the query and tid is T's tid. If a result is found, then that result is visible to T. If a result is not found, then the committed results map 1402 is examined. If a result for the query exists in the committed result map, then that result is visible to T. Otherwise, no cached query result for the query is visible to T.

It there is no query result for the query that is visible to T, then the query is issued to the server (step 1622). A new cached query result 1416 is created with a value representing the result of the query issued to the server 1306 (step 1624). The new query result is uniquely identified by a result key 1414 given by the pair (query-spec,tid), where query-spec is the query issued to the server 1306 and tid is T's tid.

The new query result is added to result map 1406 (step 1626). The new query result is added to T's pending results set 1410 (step 1628).

If, at step 1620, it is determined that there is a cached query result visible with the context T, then it is determined whether or not that query result is valid (step 1630). A cached query result 1416 is valid if the value of the cached query result 1416 is not null. If the query result is not valid, then the query is issued to the server 1306 (step 1632). The value of the cached query result 1416 is updated to represent the result of the query issued to the server 1306 (step 1634). Note that committed results are never invalid. Thus, an invalid query result visible to T must be a pending query result associated with T, and can therefore be updated without affecting other transactions.

If the query result is valid (as determined at step 1630), then it is determined whether or not that query result is a committed result (step 1640). A query result is a committed result if the tid component of its associated result key 1414 is not the same as T's tid.

If the query result is a committed result, then the result is marked as being "accessed by T" (step 1642) and the method proceeds to step 1650. Otherwise, the method simply proceeds to step 1650. At step 1650, the value of the query result is returned to the client 1302 (step 1650), and the method is terminated.

Figure 17:
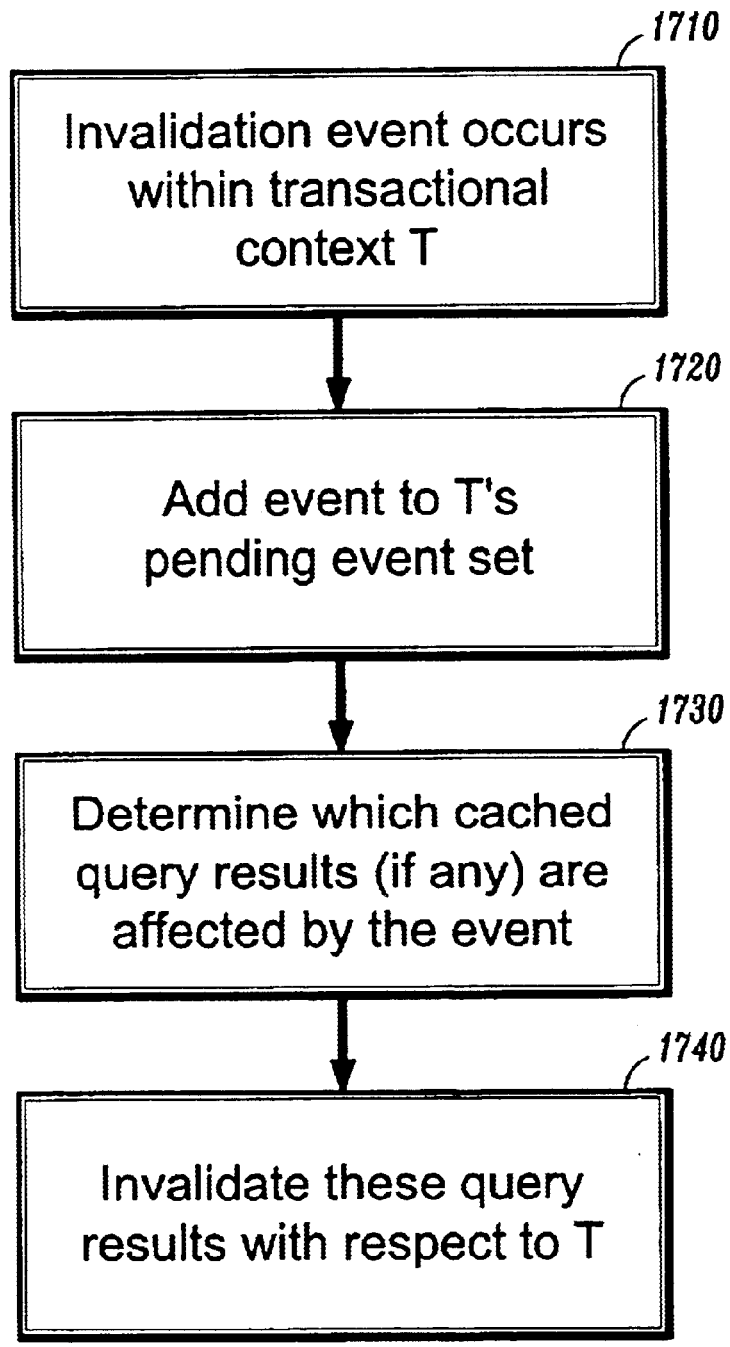
FIG. 17 is a flow diagram illustrating a method for invalidating query results with respect to transactions and optimistic concurrency control, according to an illustrative embodiment of the invention.

FIG. 17 is a flow diagram illustrating a method for invalidating query results with respect to transactions and optimistic concurrency control, according to an illustrative embodiment of the invention. That is, FIG. 17 illustrates a method for invalidating transactionally cached query results due to changes on server 1306 within the context of some transaction T.

It is determined that an invalidation event has occurred in transactional context T (step 1710). This determination can be made by notification from the dependency manager 1308. As mentioned above, the dependency manager 1308 manages dependencies between query results and data stored on the server 1306. The dependency manager 1308 detects when a transactional client 1302 executing in some transactional context T updates data on which a query result may be dependent.

The invalidation event is added to T's pending events set 1412 (step 1720). The cached query results associated with T and affected by the event, if any, are identified (step 1730). Such identifications can be made using the dependency manager 1308.

The cached query results affected by the event are invalidated (step 1740). For each such affected query result, QR, with result key, RK, invalidation occurs as follows. If query result QR is a committed result, then a new query result $QR_{NEW}$ is created with a null value (or a valid value) and a result key $RK_{NEW}$ such that the query-spec component of $RK_{NEW}$ is the same as the query-spec component of RK and the tid component of $RK_{NEW}$ is T's tid; $QR_{NEW}$ is added to result map 1406. If the query result QR is not a committed result, then the value of the query result QR is set to null or updated such that the value is no longer invalid.

Figure 18:
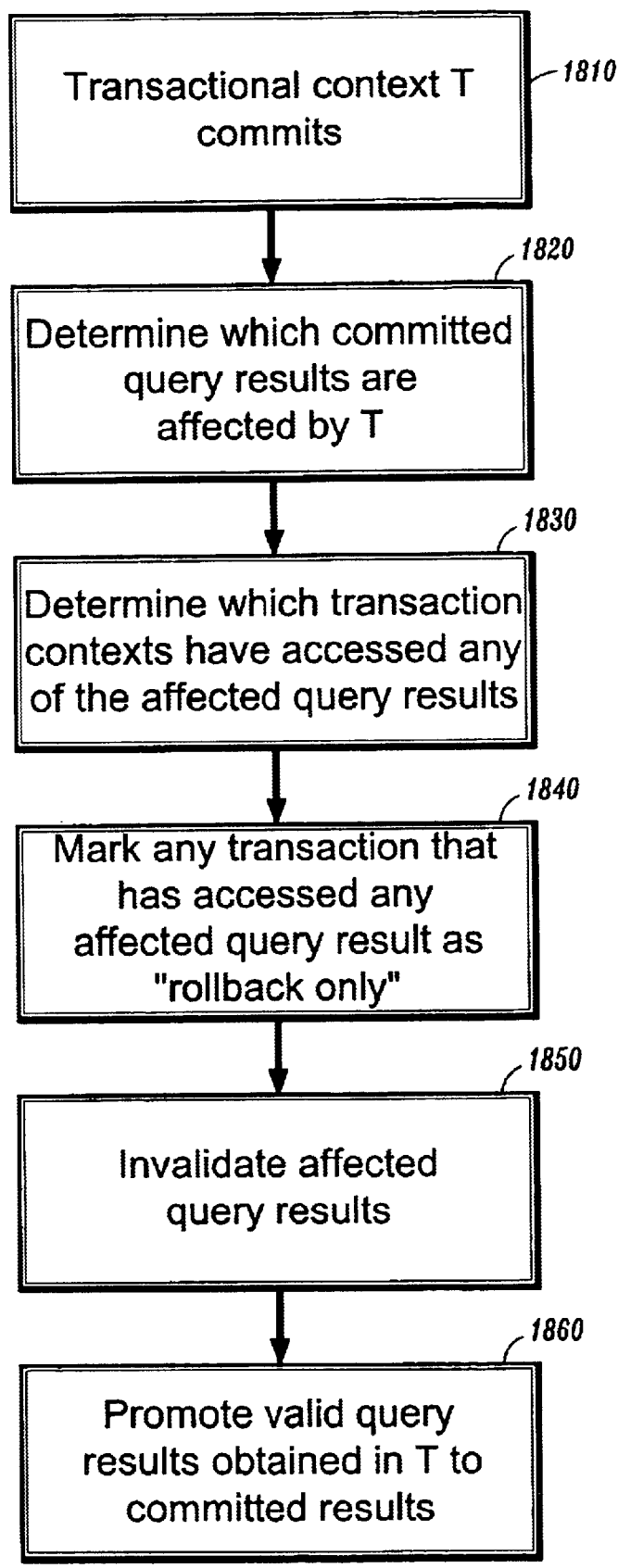
FIG. 18 is a flow diagram illustrating a method for promoting pending cached query results to committed results and for maintaining dependencies between committed results and underlying data when a transactional context T successfully commits, according to an illustrative embodiment of the invention.

FIG. 18 is a flow diagram illustrating a method for promoting pending cached query results to committed results and for maintaining dependencies between committed results and underlying data when a transactional context T successfully commits, according to an illustrative embodiment of the invention.

It is determined that some transactional context T has successfully committed on the server 1306 (step 1810). This determination can be made by notification from the transaction manager 1310.

The committed results affected by T committing, if any, are identified (step 1820). This is done using the dependency manager 1308 and T's pending events set 1412.

The transactions that have accessed any of the affected query results (determined at step 1820) are identified (step 1830). The transactions identified at step 1830 are marked as "rollback only" such that the only possible outcome of these transactions will be a rollback (step 1840). The affected cached query results (determined at step 1820) are invalidated (step 1850). When a committed result is invalidated, that result is removed from the result map 1406 and discarded.

Valid query results obtained within context T are promoted to committed results (step 1860). This is done as follows. For each valid query result in T's pending results set 1410, that query result is added to committed results map 1402. Any invalid query result in T's pending result set is discarded. T's cache context and associated pending results set 1410 and pending events set 1412 are discarded. Any association between a committed result and T's context is removed.

Figure 19:
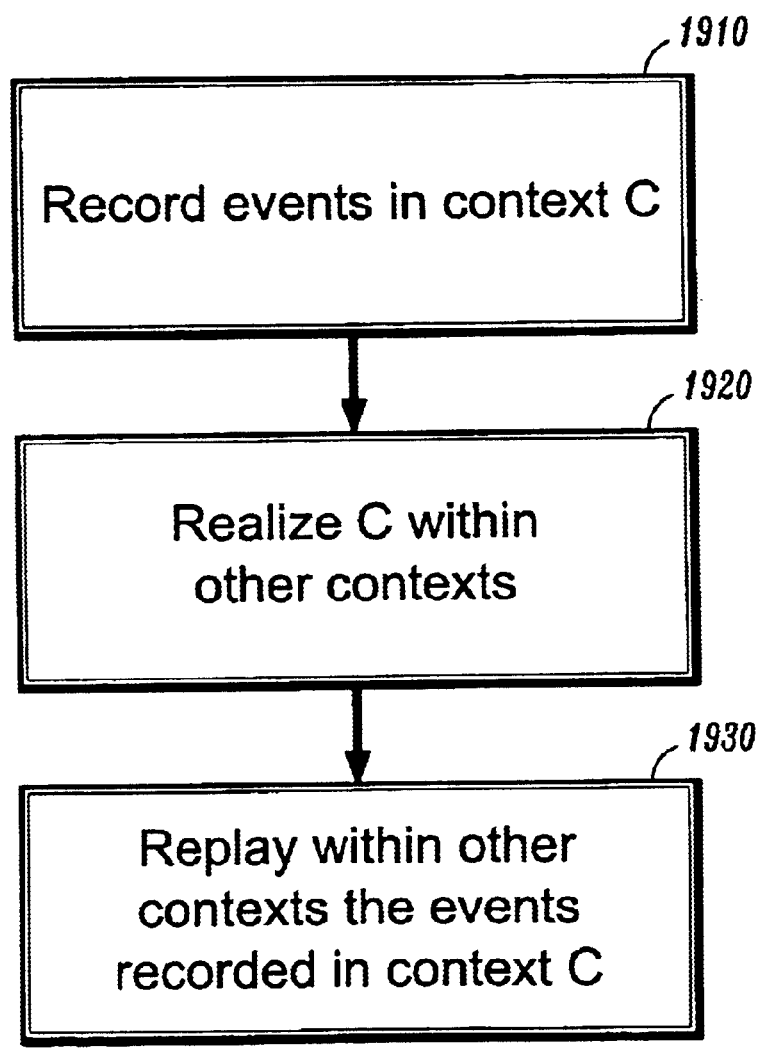
FIG. 19 is a flow diagram illustrating a method for maintaining dependencies between objects and underlying data when the effects of one context are realized within another context, according to an illustrative embodiment of the invention.

FIG. 19 is a flow diagram illustrating a method for maintaining dependencies between objects and underlying data when the effects of one context are realized within another context, according to an illustrative embodiment of the invention. The events that occur within some context, C, that may affect the dependencies between objects and underlying data within other contexts, are recorded (step 1910). An event might be, for example, a change to underlying data that affects a dependency; such an event might trigger a cached object to be removed or modified.

Changes performed within context C are realized in zero or more other contexts (step 1920). For example, if context C is a transactional context, then, when C commits, the changes performed within context C might be visible to other transactional contexts.

The events recorded in context C are replayed in zero or more other contexts (step 1930). An event might, for example, represent a change to underlying data that affects a dependency; replaying such an event might trigger a cached object to be removed or modified.

FIGS. 20–23 depict various aspects of the context manager 110 of FIG. 1 with respect to a pessimistic transactional model. In a pessimistic transactional model, concurrent transactions are permitted within the scope of a context manager to the extent that operations occurring in one concurrent transaction have no effect on any other concurrent transaction. That is, it is as if each of the concurrent transactions were run serially with respect to each other. For example, if a concurrent transaction Tx1 performs a write operation prior to a concurrent transaction Tx2 performing a read (or write) operation on the same data, then Tx2 must wait until Tx1 either commits or rollsback.

Described below are various aspects of the invention pertaining to the caching of entities in a pessimistic transactional environment.

FIGS. 20–23 depict methods for managing a cache of entities, which might be complex entities such as, for example, query results, composed Web pages, or some other manageable content, under the auspices of the pessimistic transactional model. Referring back to the system 100 of FIG. 1, the client 102 obtains entities through the cache 104 from the data source manager 106 by providing some inquiry to which a response is generated and returned under the direction of a pessimistic transaction manager 110 (i.e., the context manager 100 of FIG. 1). Dependencies are managed by the pessimistic transaction manager 110, a data source manager 106 (i.e., the server 106 of FIG. 1), or by a separate dependency manager (similar to the dependency manager 1308 of FIG. 13). One of the many benefits of the invention is that latency is reduced by utilizing cached entities as opposed to non-cached entities; it should also be noted that integrity is maintained, as is required by the pessimistic transactional model.

Figure 20:
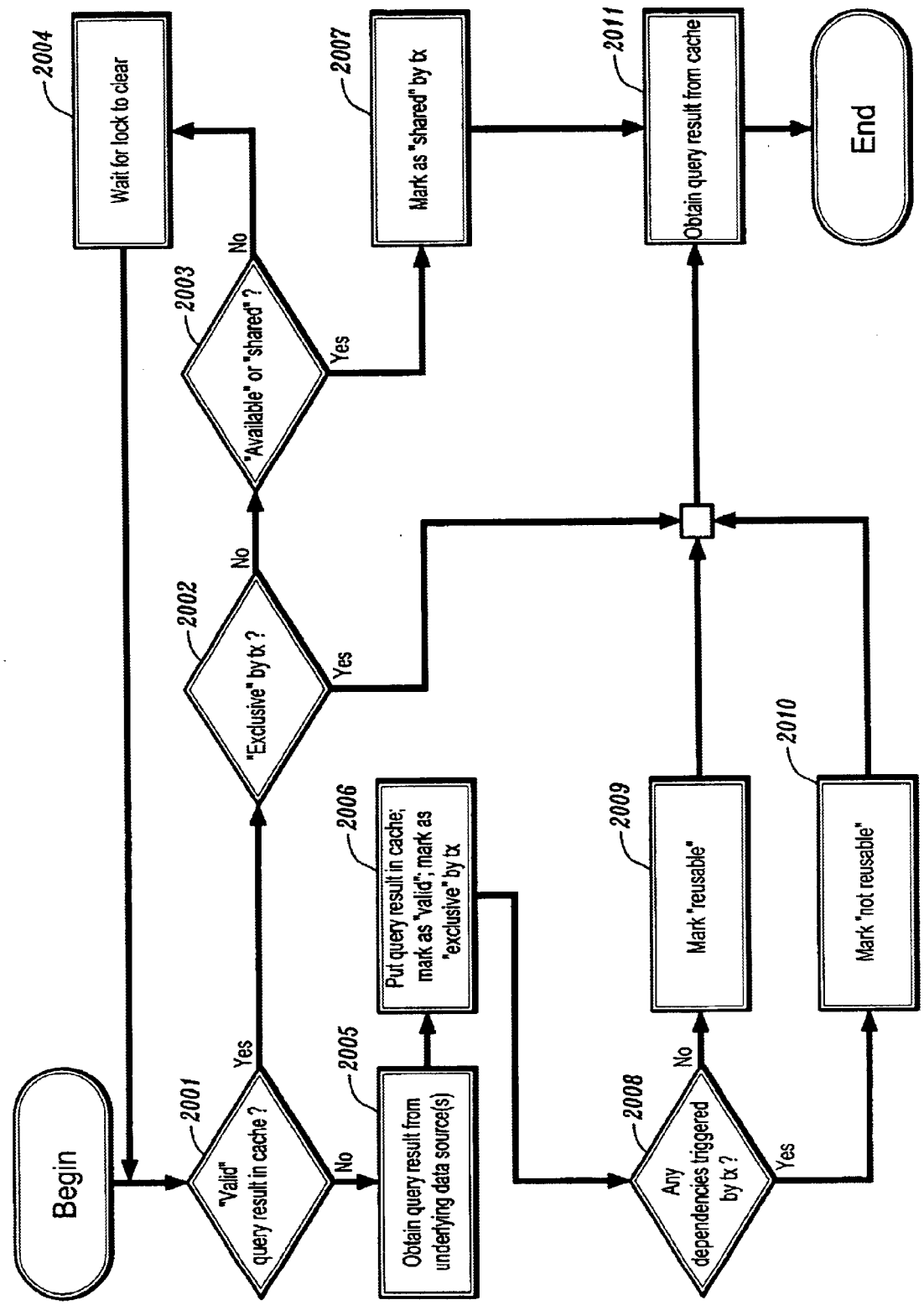
FIG. 20 is a diagram illustrating a method for retrieving zero or more entities (i.e., query results) from a cache, according to an illustrative embodiment of the invention.

FIG. 20 is a diagram illustrating a method for retrieving zero or more entities (i.e., query results) from a cache, according to an illustrative embodiment of the invention.

According to the model, it is determined whether the current query can be satisfied by a "valid" query result (step 2001) presently residing in the cache 104. If not, then the query result is obtained from an underlying data source(s) (step 2005). The query result is placed into the cache 104, the query result is marked as "valid", and the query result is also marked as "exclusive" to the present transaction (step 2006).

The placing of the query result in the cache 104 is done by utilizing the query request as the key (FIG. 2, key), the transaction identifier as the context (FIG. 2, $C_n$), and the query result as the value (FIG. 2, $V_n$); or alternatively by utilizing the combined query request and the transaction identifier as the compound key (FIG. 3, key % $C_n$) and the query result as the value (FIG. 3, $V_n$).

To determine whether a query can be satisfied by a query result residing in the cache, the query request and the transaction identifier are used together (as per FIG. 2 or FIG. 3) to locate the query result in the cache. If the query result is found in the cache, then the query result is examined to determine if it is marked "valid". If so, then the query result is considered resident in cache.

It is then determined whether any dependencies for the query at hand have been triggered by the present transaction (step 2008). This determination can be made in one of three illustrative and basic ways. However, one of ordinary skill in the related art will readily contemplate these and various other ways for making the determination, while maintaining the spirit and scope of the invention. The first way is to always presume that one or more dependencies have been triggered by the present transaction without any record keeping. The second way is to keep track of whether at least one invalidation has been triggered by the present transaction. The third way is to keep track of all invalidations triggered by the present transaction and determine whether any of those already triggered invalidations pertain to the query at hand. If it is determined (at step 2008) that a dependency relevant to the query at hand has been triggered by the present transaction, then the cached query result is marked "not reusable" (step 2010) and the method proceeds to step 2011. Otherwise, the cached query result is marked "reusable" (step 2009) and the method proceeds to step 2011. At step 2011, a query result corresponding to the query at hand is returned from the cache, and the method is terminated.

If it is determined at step 2001 that the current query can be satisfied from the cache because a "valid" query-keyed value (e.g., cached query result) exists in the cache, then it is determined whether the query-keyed value is marked "exclusive" by the present transaction (step 2002). If so, then the method proceeds to step 2011. Otherwise, it is determined whether the query-keyed value is marked either "shared" or "available" (step 2003). If the query-keyed value is not currently marked either "shared" or "available", then a status change is waited for (step 2004), and the method returns to step 2001 to recheck for a "valid" cached query result. Otherwise, the query-keyed value is marked as "shared" by the present transaction, where more than one transaction may concurrently be identified as such (step 2007) and the method proceeds to step 2011.

Figure 21:
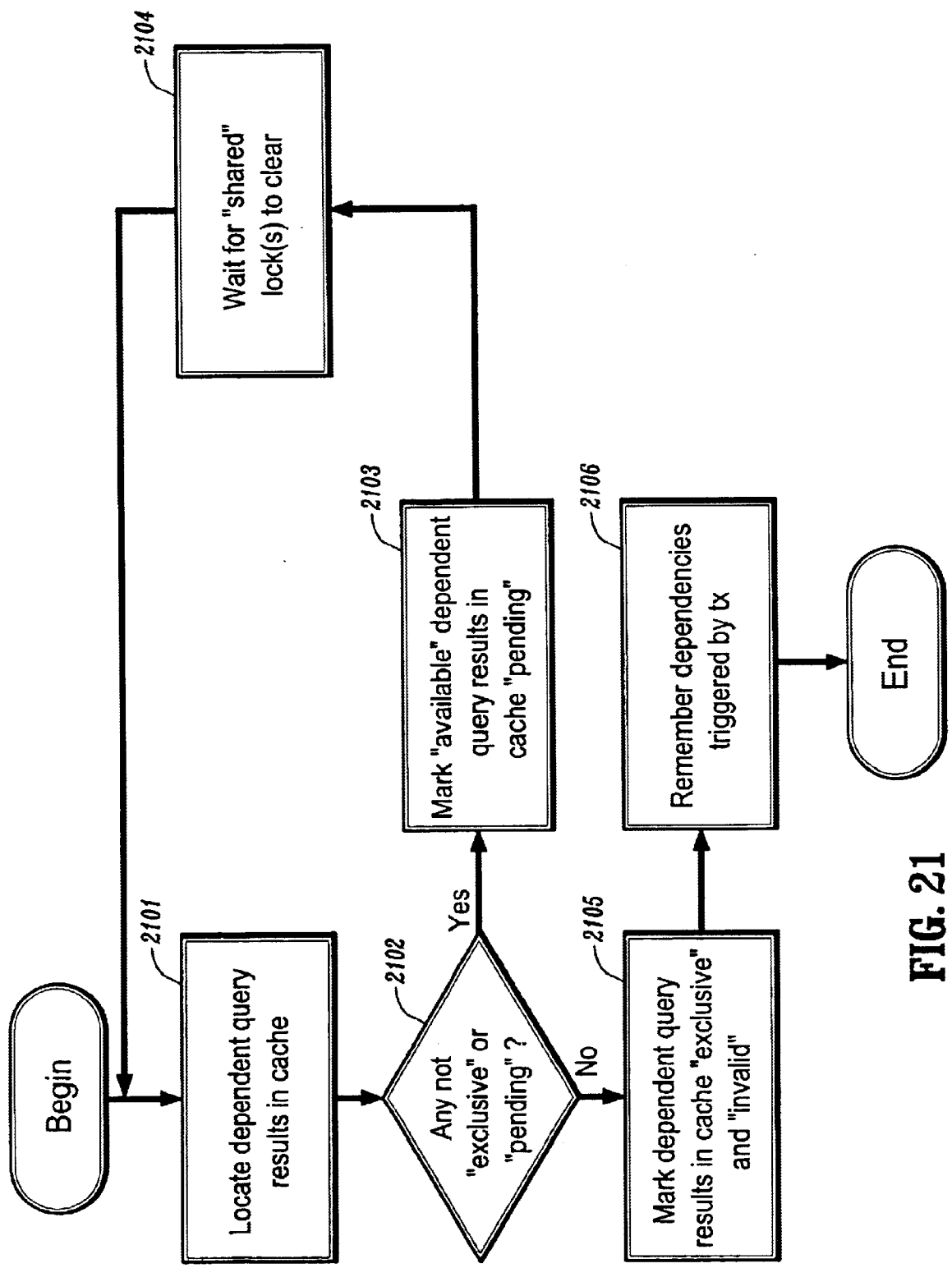
FIG. 21 is a flow diagram illustrating a method for invalidating zero or more entities (query results) in a cache, according to an illustrative embodiment of the invention.

FIG. 21 is a flow diagram illustrating part of a method for invalidating zero or more entities (query results) in a cache, according to an illustrative embodiment of the invention. The set of query results to which the currently triggered invalidation pertains, which resides in the cache 104, is located (step 2101).

For example, presume that within a given context a cached query result $QR_1$ was produced by query $Q_1$: "Car.color==red", where Car is an object, color is an attribute of the Car object, and "red" is the value of the color attribute of a Car object. Subsequently, a set attribute operation either changed the color attribute of a currently "red" Car object to some other color or a non-"red" Car object to "red". Then, an invalidation is triggered for at least $QR_1$, since $QR_1$ has a dependency on the color attribute of Car objects.

The produced cached query results set is examined to determine if any of the query results are not marked as either "exclusive" or "pending" (step 2102). If so, then the cached query results in the produced set which are "available" are marked as "pending" (step 2103). A relevant status change occurrence is waited for one or more of the query results in the produced query results set (step 2104), e.g., a status change from "shared" to "available". Then, the method returns to step 2101 to relocate the set of cached query results dependent upon the present invalidation.

However, if at step 2102, any of the query results in the produced cached query results set are determined to be marked as either "exclusive" or "pending", then those query results are marked "exclusive" and "invalid" (step 2105). The triggered dependencies are remembered (step 2106). Keeping track of the triggered dependencies can be done in one of several ways as discussed above with respect to FIG. 20. The method is then terminated.

Figure 22:
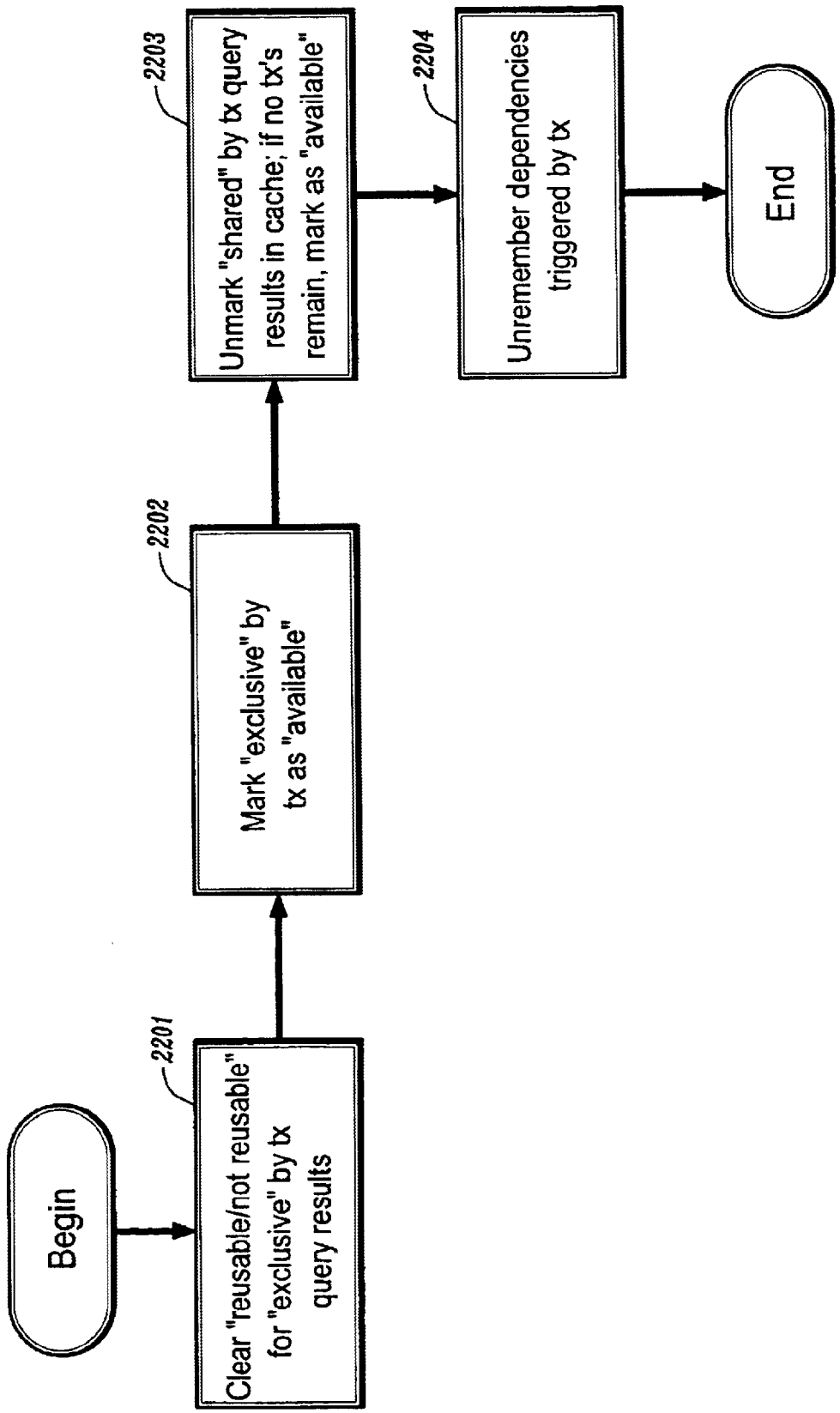
FIG. 22 is a block diagram illustrating a method for committing zero or more entities (query results) in a cache, according to an illustrative embodiment of the invention.

FIG. 22 is a block diagram illustrating a method for committing zero or more entities (query results) in a cache, according to an illustrative embodiment of the invention.

The "reusable" or "not reusable" status is cleared for each query result entry marked "exclusive" in the cache 104 to which the currently committing transaction pertains (step 2201). The status "exclusive" is changed to "available" for each query result entry in the cache 104 to which the currently committing transaction pertains (step 2202). The committing transaction is unmarked from each "shared" query result entry in the cache to which the committing transaction has been associated, and if no other transactions have a "shared" interest, then the query result entry in the cache is marked as "available" (step 2203). Any previously remembered triggered dependencies with respect to the committing transaction (FIG. 21, step 2106) are unremembered (step 2203).

Figure 23:
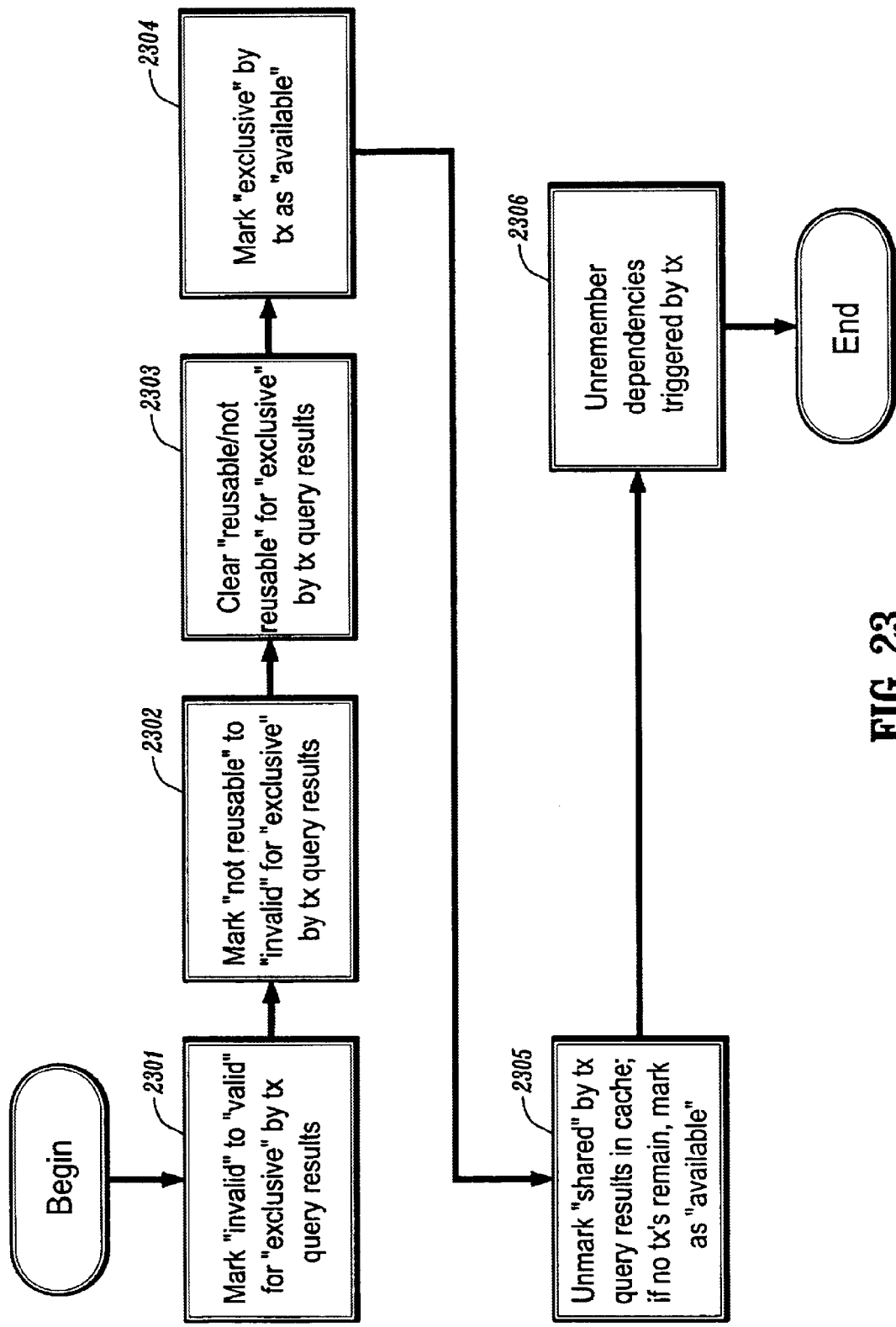
FIG. 23 is a block diagram illustrating a method for rolling back one or more entities (query results) in a cache, according to an illustrative embodiment of the invention.

FIG. 23 is a block diagram illustrating a method for rolling back one or more entities (query results) in a cache, according to an illustrative embodiment of the invention. The status "invalid" is changed to "valid" for each query result entry marked "exclusive" in the cache 104 to which the currently committing transaction pertains (step 2301). Each query result entry marked "exclusive" and "not reusable" in the cache 104 to which the currently committing transaction pertains is marked as "invalid" (step 2302). The "reusable" or "not reusable" status is cleared for each query result entry marked "exclusive" in the cache 104 to which the currently committing transaction pertains (step 2303). The status "exclusive" is changed to "available" for each query result entry in the cache 104 to which the currently committing transaction pertains (step 2304). The present transaction is unmarked from each "shared" query result entry in the cache 104 to which the transaction has been associated, and if no other transactions have a "shared" interest, then the query result entry in the cache 104 is also marked as "available" (step 2305). Any triggered dependencies previously remembered with respect to the present transaction (FIG. 21, step 2106) are unremembered (step 2306).

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. In a system comprised of a plurality of objects and at least one cache, wherein each object has a key associated therewith and is capable of having different values for at least two of a plurality of different contexts, a method for caching at least some of the plurality of objects, comprising the steps of maintaining cache directory structure in which at least two different values are capable of being associated with at least one of the plurality of objects, each of the at least two different values corresponding to a different context;

identifying an object to be cached from among the plurality of objects and a context from among the plurality of different contexts; and storing the identified object in the at least one cache based upon the key associated therewith and the identified context.

2. The method according to claim 1, wherein the at least one cache maintains at least a portion of a data structure for storing multiple versions of the identified object and said storing step further comprises the step of identifying the at least a portion of the data structure from the key associated with the identified object.

3. The method according to claim 1, wherein said storing step further comprises the steps of:

generating a composite index from the key associated with the identified object and the identified context; and storing the identified object based upon the composite index.

4. The method according to claim 1, further comprising the step of looking up a given object from among the plurality of objects based upon a key associated with the given object and one of the plurality of different contexts.

5. The method according to claim 1, further comprising the step of deleting a cached object based upon a key associated with the cached object and one of the plurality of different contexts.

6. The method according to claim 1, further comprising the steps of:

maintaining a data structure that includes at least one key associated with at least one given object from among the plurality of objects, the at least one given object being cached within one of the plurality of different contexts; and deleting the at least given object by identifying the at least one object in the data structure based upon the at least one key associated therewith.

7. The method according to claim 1, further comprising the step of copying at least one given object from among the plurality of objects that is cached under one of the plurality of contexts to another one of the plurality. of contexts.

8. The method according to claim 1, wherein the plurality of different contexts represent transactional contexts.

9. The method according to claim 1, wherein cached objects represent query results.

10. The method according to claim 1, wherein said method is implemented by a program storage device readable by machine, tangibly embodying a program of instructions executable by the machine to perform said method steps.

11. In a system comprised of at least one object capable of having a plurality of values within a plurality of different contexts, a method for propagating at least one of the plurality of values among the plurality of different contexts, said method comprising the steps of:

maintaining at least one dependency between the at least one object and underlying data;

identifying the at least one of the plurality of values for the at least one object within a context from among the plurality of contexts; and propagating the at least one of the plurality of values to at least one other context from among the plurality of contexts, wherein the at least one object has identical dependencies in the context and the at least one other context.

12. The method according to claim 11, wherein the underlying data is dependent underlying data, and at least some of the plurality of values are derived from the dependent underlying data.

13. The method according to claim 11, wherein the underlying data is dependent underlying data, and at least some of the plurality of values are query results derived from the dependent underlying data.

14. The method according to claim 11, wherein the plurality of different contexts are transactional contexts.

15. The method according to claim 11, wherein cached objects are query results and the plurality of different contexts are transactional contexts.

16. The method according to claim 11, wherein said method is implemented by a program storage device readable by machine, tangibly embodying a program of instructions executable by the machine to perform said method steps.

17. In a system comprised of at least one object capable of having a plurality of values within a plurality of different contexts, wherein a value from among the plurality of values of the at least one object depends on underlying data, a method for maintaining dependencies between the at least one object and the underlying data when effects from a context among the plurality of contexts are realized within at least one other context among the plurality of contexts, said method comprising the steps of:

recording at least one event that occurs with the context, wherein the at least one event is capable of affecting dependencies between the at least one object and the underlying data within the at least one other context;

realizing, within the at least one other context, changes to the underlying data performed under the context; and replaying, within the at least one other context, the at least one event recorded within the context.

18. The method according to claim 17, wherein the plurality of contexts are transactional contexts and said realizing step comprises the step of committing the context as a transactional context.

19. The method according to claim 17, wherein said method is implemented by a program storage device readable by machine, tangibly embodying a program of instructions executable by the machine to perform said method steps.

20. A computer system, comprising:

a cache directory,
wherein at least two different values are capable of being associated with at least one of a plurality of objects,
wherein each of the at least two different values correspond to a different context,
wherein each of the plurality of objects comprises a key associated therewith, and
wherein each of the plurality of objects is capable of having different values for at least two of a plurality of different contexts;

means for identifying an object to be cached from among the plurality of objects and a context from among the plurality of different context; and means for storing the identified object in at least one cache based upon the key associated therewith and the identified context.

21. The system according to claim 20, further comprising a context manager adapted to manage the plurality of different contexts.

22. The system according to claim 20, wherein said context manager is a transaction manager.

23. The system according to claim 21, wherein said context manager is a transaction manager adapted to support lock-based, pessimistic concurrency control.

24. The system according to claim 21, wherein said context manager is a transaction manager adapted to support optimistic concurrency control.

* * * * *

UNITED STATES PATENT AND TRADEMARK OFFICE
CERTIFICATE OF CORRECTION

PATENT NO. : 6,823,514 B1
DATED : November 23, 2004
INVENTOR(S) : Degenaro et al.

It is certified that error appears in the above-identified patent and that said Letters Patent is hereby corrected as shown below:

Column 15,
Line 42, "maintaining cache directory structure" should be changed to -- maintaining a cache directory structure --.

Signed and Sealed this

Eighth Day of February, 2005

JON W. DUDAS
*Director of the United States Patent and Trademark Office*